United States Patent
Zhou et al.

(10) Patent No.: US 10,138,375 B2
(45) Date of Patent: *Nov. 27, 2018

(54) METHOD FOR MANUFACTURING ASPHALTIC SHEET MATERIALS INCLUDING EXPANDABLE GRAPHITE

(71) Applicant: FIRESTONE BUILDING PRODUCTS CO., LLC, Nashville, TN (US)

(72) Inventors: Wensheng Zhou, Carmel, IN (US); Michael Hubbard, Anderson, IN (US)

(73) Assignee: Firestone Building Products Co., LLC, Nashville, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/899,838

(22) Filed: Feb. 20, 2018

(65) Prior Publication Data
US 2018/0179385 A1  Jun. 28, 2018

Related U.S. Application Data

(63) Continuation of application No. 14/895,131, filed as application No. PCT/US2014/047391 on Jul. 21, 2014, now Pat. No. 9,920,200.

(60) Provisional application No. 61/857,403, filed on Jul. 23, 2013.

(51) Int. Cl.
| | |
|---|---|
| *C08L 95/00* | (2006.01) |
| *D06N 5/00* | (2006.01) |
| *E04D 5/02* | (2006.01) |
| *C08K 3/04* | (2006.01) |
| *C08L 101/00* | (2006.01) |
| *E04D 5/10* | (2006.01) |

(52) U.S. Cl.
CPC .............. *C08L 95/00* (2013.01); *C08K 3/04* (2013.01); *C08L 101/00* (2013.01); *D06N 5/003* (2013.01); *E04D 5/02* (2013.01); *C08L 2555/30* (2013.01); *C08L 2555/40* (2013.01); *C08L 2555/80* (2013.01); *D06N 2209/067* (2013.01); *E04D 5/10* (2013.01)

(58) Field of Classification Search
CPC .............. D06N 2209/067; C08L 95/00; C08L 2555/40; C08L 2555/80
See application file for complete search history.

(56) References Cited

U.S. PATENT DOCUMENTS

| | | |
|---|---|---|
| 3,574,644 A | 4/1971 | Olstowski et al. |
| 4,437,896 A | 3/1984 | Partanen |
| 4,835,199 A | 5/1989 | Futamura et al. |
| 4,992,315 A | 2/1991 | Zickell et al. |
| 5,094,780 A | 3/1992 | Von Bonin |
| 5,247,005 A | 9/1993 | Von Bonin |
| 5,516,817 A | 5/1996 | Slusher et al. |
| 6,486,236 B2 | 11/2002 | Wollum et al. |
| 6,492,439 B2 | 12/2002 | Wollum et al. |
| 6,924,015 B2 | 8/2005 | Zanchetta et al. |
| 7,070,843 B2 | 7/2006 | Bartek et al. |
| 7,146,771 B2 | 12/2006 | Swann |
| 7,442,270 B2 | 10/2008 | Bartek |
| 2006/0240224 A1* | 10/2006 | Khan ..................... B32B 11/00 428/143 |

FOREIGN PATENT DOCUMENTS

| | | | |
|---|---|---|---|
| EP | 2532515 A1 | 12/2012 | |
| JP | 60-028436 | 2/1985 | |
| RU | 2460834 C1 * | 9/2012 | ............... E04D 5/10 |

OTHER PUBLICATIONS

International Search Report and Written Opinion for Intl. Appl. No. PCT/US2014/047391 dated Nov. 12, 2014, pp. 1-15.
Krassowski, et al. "Expandable Graphite Flake as an Additive for a New Flame Retardant Resin" Retrieved from Internet at http://graftechaet.com/getattachment/ae9e84a0-031e-452e-a66b-3d717fe7577d/GRAFGUARD-Expandable-Graphite-Flake-as-an-Additive.aspx, Retrieved on Nov. 6, 2014, pp. 1-10.

* cited by examiner

*Primary Examiner* — Kara B Boyle
(74) *Attorney, Agent, or Firm* — Brian D. McAlhaney; Arthur M. Reginelli (57) ABSTRACT

A method for producing an asphaltic sheet having expandable graphite dispersed in one or more asphaltic components thereof, the method comprising: (i) preparing a masterbatch by combining asphalt binder and polymeric modifier at a first temperature; (ii) cooling the masterbatch to a second temperature, where the second temperature is lower than the first temperature; (iii) adding, after said step of cooling, expandable graphite to the masterbatch to thereby form an asphaltic composition including expandable graphite; and (iv) fabricating a sheet with the asphaltic composition including expandable graphite.

14 Claims, 1 Drawing Sheet

METHOD FOR MANUFACTURING ASPHALTIC SHEET MATERIALS INCLUDING EXPANDABLE GRAPHITE

This application is a continuation of U.S. Ser. No. 14/895,131, currently pending, having been filed on Dec. 1, 2015; which is a U.S. National Stage Application of PCT/US2014/047391, filed on Jul. 21, 2014, which claims the benefit of U.S. Provisional Application Ser. No. 61/857,403, filed Jul. 23, 2013, all of which are incorporated herein by reference.

FIELD OF THE INVENTION

Embodiments of the present invention are directed toward methods for manufacturing asphaltic sheet materials that include expandable graphite.

BACKGROUND OF THE INVENTION

Asphaltic sheet materials are widely used in the construction industry. For example, polymer-modified asphaltic sheet material is used as membrane for waterproofing flat or low-sloped roofs. As is known in the art, these roofing systems may include multiple layers of asphaltic sheet including base sheets and cap sheets. Other examples include barriers materials such air, vapor, or moisture barriers. These materials are typically used on roofs or vertical surfaces such as walls to provide the desired air, vapor and/or moisture resistance to a structure. Still other examples include underlayments, which are used in the roofing industry to provide an extra layer of protection to the roof. This additional protection may provide, among other benefits, water, moisture, thermal, and/or fire resistance. As the name implies, underlayment is typically positioned below the external or primary roofing protection, which may include shingles, membranes such as polymeric or asphaltic membranes, roofing tiles, and metal panels or cladding.

In order to meet certain fire resistance properties, which may be required by code or classification, fire or flame resistant asphaltic sheet may be employed. As is known in the art, asphaltic sheet can be provided with a degree of fire or flame resistance by including therein fire or flame retardant materials. Many flame retardant materials have been proposed including, for example, intumescent materials as suggested by U.S. Pat. No. 5,516,817. Intumescent materials operate by forming a char layer that is believed to mitigate flame spread over more flammable materials by impeding the oxygen supply to those more flammable materials.

The use of intumescent materials, however, can be problematic because the temperatures at which the asphaltic sheet can be manufactured or processed must be below the temperature at which the char layer forms. Indeed, if the processing temperature of the asphaltic sheet is above the temperature at which the intumescent materials forms a char, then the manufacture of the desired product is frustrated, if not precluded.

Because the use of intumescent materials as flame retardants in asphaltic sheet is believed to be advantageous, there is a need to develop manufacturing techniques that allow for the inclusion of intumescent materials into the asphaltic sheet without triggering the char-forming behavior of the intumescent material. Indeed, in so doing, the scope of useful intumescent materials can be expanded.

SUMMARY OF THE INVENTION

One or more embodiments of the present invention provide a method for producing an asphaltic sheet having expandable graphite dispersed in one or more asphaltic components thereof, the method comprising: (i) preparing a masterbatch by combining asphalt binder and polymeric modifier at a first temperature; (ii) cooling the masterbatch to a second temperature, where the second temperature is lower than the first temperature; (iii) adding, after said step of cooling, expandable graphite to the masterbatch to thereby form an asphaltic composition including expandable graphite; and (iv) fabricating a sheet with the asphaltic composition including expandable graphite.

Other embodiments of the present invention provide a method for incorporating expandable graphite into a molten asphaltic composition in order to produce a molten asphaltic composition having expandable graphite dispersed therein, the method comprising: (i) heating asphaltic binder to a temperature of at least 180° C.; (ii) adding one or more constituents to the asphaltic binder and to form a masterbatch; (iii) mixing the masterbatch at a temperature of at least 180° C.; (ii) cooling the masterbatch to a temperature of at most 180° C.; and (iii) adding expandable graphite to the masterbatch at a temperature of at most 180° C.

DETAILED DESCRIPTION OF ILLUSTRATIVE EMBODIMENTS

Introduction

Embodiments of the present invention are based, at least in part, on the discovery of manufacturing technique whereby intumescent materials, particularly expandable graphite, can be incorporated into asphaltic sheet without deleterious expansion of the graphite. In a first embodiment, a molten asphaltic composition is prepared at a first temperature, allowed to cool to a second temperature that is below the first temperature, and then expandable graphite is introduced to the molten asphaltic composition at the second temperature. In a second embodiment, expandable graphite is combined with a carrier material to form an expandable graphite concentrate, and the concentrate is added to a molten asphaltic composition. In certain embodiments, the first and second embodiments described herein are practiced together.

Sheet Construction

Figure 1:
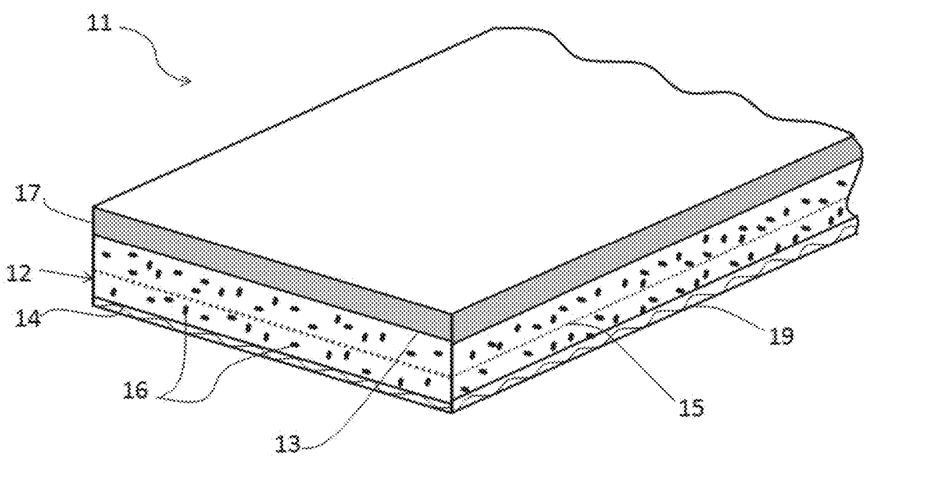
FIG. 1 is a cross-sectional perspective view of an asphaltic sheet produced by one or more embodiments of the invention.

In one or more embodiments, the asphaltic sheet produced by one or more embodiments of the invention includes a planar body of asphalt material, which may also be referred to as the asphalt component of the sheet or asphalt layer 12. For example, as shown in FIG. 1, asphaltic sheet 11 includes asphalt component 12 having a first planar surface 13 and second planer surface 14. Sheet 11 may include an optional textile fabric 15 embedded or impregnated within asphaltic component 12. In certain embodiments, the sheet is devoid of a scrim or fabric. Asphaltic component 12, as will be described in greater detail below, may include various constituents such as polymeric modifiers and fillers, as well as expandable graphite 16 and optional complementary flame retardants (not shown) according to the present invention. In one or more embodiments, sheet 11 may further include one or more polymeric layers 17 laminated to asphalt component 12 of sheet 11. For example, asphaltic sheet 11 may include an asphaltic component 12 laminated to a polypropylene sheet. In other embodiments, layer 17 may include a layer of release agents, such as silica, sand or talc. Additionally, a release film 19 may be removably secured to at least one of the exposed planar surfaces 13 or 14.

In one or more embodiments, optional textile fabric 15, which may also be referred to as fabric reinforcement 15, reinforcing member 15, or simply reinforcement 15, may include woven and/or non-woven fabrics. Various fabric reinforcements are known in the art, and practice of the present invention is not necessarily limited by the selection of a particular fabric. In one or more embodiments, reinforcement 15 may be fabricated from fiberglass and/or synthetic yards or filaments. Exemplary synthetic yarns include those prepared from polyesters or polyimides.

In one or more embodiments, the thickness of the asphaltic sheet 11 produced according to methods of the invention may be at least 10, in other embodiments at least 20, and in other embodiments at least 30 mils. In these or other embodiments, the thickness of asphaltic sheet 11 may be at most 120, in other embodiments at most 100, in other embodiments at most 90, and in other embodiments at most 80 mils. In one or more embodiments, the thickness of asphaltic sheet 11 may be from about 10 to about 100, in other embodiments from about 20 to about 90, and in other embodiments from about 30 to about 80 mils. In other embodiments, especially where the asphaltic sheet is used in a vertical application, the thickness of the asphaltic sheet may be substantially thinner. For example, the thickness of the sheet may be less than 20, in other embodiments less than 15, and in other embodiments less than 10 mils, with the thickness ranging from 2 to 20 mils, in other embodiments from 3 to 15 mils, and in other embodiments from 5 to 10 mils.

In one or more embodiments, the weight of the asphaltic sheet produced by methods of the invention may be at least 5, in other embodiments at least 10 and in other embodiments at least 15 pounds per hundred square feet. In these or other embodiments, the weight of the asphaltic sheet may be at most 90, in other embodiments at most 70, and in other embodiments at most 50 pounds per hundred square feet. In these or other embodiments, the weight of the asphaltic sheet may be from 5 to 100, in other embodiments from 10 to 80, and in other embodiments from 15 to 50 pounds per hundred square feet. In other embodiments, especially where the asphaltic sheet is used in a vertical application, the weight of the asphaltic sheet may be substantially lighter. For example, the weight of the sheet may be less than 60, in other embodiments less than 50, and in other embodiments less than 40 pounds per hundred square feet, with the weight ranging from 5 to 60, in other embodiments from 10 to 50, and in other embodiments from 15 to 40 pounds per hundred square feet.

Asphaltic Masterbatch

As noted above, the methods of the present invention include the formation of a molten asphaltic composition to which expandable graphite, either alone or in combination with a carrier, is added or introduced. For ease of description, this asphaltic composition, prior to the addition or combination with expandable graphite, may be referred to as an asphaltic masterbatch. In one or more embodiments, the asphaltic masterbatch includes an asphalt binder and an inorganic filler. In one or more embodiments, the asphaltic masterbatch may also include polymeric modifiers, tackifiers, complementary flame retardants, and other constituents conventionally used in asphaltic-based building materials.

Asphalt Binder

The term "asphalt binder" is used as understood by those skilled in the art and is consistent with the meaning provided by AASHTO M320. As used within this specification, the terms "asphalt" and "asphalt binder" may be used synonymously. The asphalt binder material may be derived from any asphalt source, such as natural asphalt, rock asphalt, produced from tar sands, or petroleum asphalt obtained in the process of refining petroleum. In other embodiments, asphalt binders may include a blend of various asphalts not meeting any specific grade definition. This includes air-blown asphalt, vacuum-distilled asphalt, steam-distilled asphalt, cutback asphalt or roofing asphalt. Alternatively, gilsonite, natural or synthetic, used alone or mixed with petroleum asphalt, may be selected. Synthetic asphalt mixtures suitable for use in the present invention are described, for example, in U.S. Pat. No. 4,437,896. In one or more embodiments, asphalt includes petroleum derived asphalt and asphaltic residual. These compositions may include asphaltenes, resins, cyclics, and saturates. The percentage of these constituents in the overall asphalt binder composition may vary based on the source of the asphalt.

Asphaltenes include black amorphous solids containing, in addition to carbon and hydrogen, some nitrogen, sulfur, and oxygen. Trace elements such as nickel and vanadium may also be present. Asphaltenes are generally considered as highly polar aromatic materials of a number average molecular weight of about 2000 to about 5000 g/mol, and may constitute about 5 to about 25% of the weight of asphalt.

Resins (polar aromatics) include dark-colored, solid and semi-solid, very adhesive fractions of relatively high molecular weight present in the maltenes. They may include the dispersing agents of peptizers for the asphaltenes, and the proportion of resins to asphaltenes governs, to a degree, the sol- or gel-type character of asphalts. Resins separated from bitumens may have a number average molecular weight of about 0.8 to about 2 kg/mol but there is a wide molecular distribution. This component may constitute about 15 to about 25% of the weight of asphalts.

Cyclics (naphthene aromatics) include the compounds of lowest molecular weight in bitumens and represent the major portion of the dispersion medium for the peptized asphaltenes. They may constitute about 45 to about 60% by weight of the total asphalt binder, and may be dark viscous liquids. They may include compounds with aromatic and naphthenic aromatic nuclei with side chain constituents and may have molecular weights of 0.5 to about 9 kg/mol.

Saturates include predominantly the straight- and branched-chain aliphatic hydrocarbons present in bitumens, together with alkyl naphthenes and some alkyl aromatics. The average molecular weight range may be approximately similar to that of the cyclics, and the components may include the waxy and non-waxy saturates. This fraction may from about 5 to about 20% of the weight of asphalts.

In these or other embodiments, asphalt binders may include bitumens that occur in nature or may be obtained in petroleum processing. Asphalts may contain very high molecular weight hydrocarbons called asphaltenes, which may be soluble in carbon disulfide, pyridine, aromatic hydrocarbons, chlorinated hydrocarbons, and THF. Asphalts or bituminous materials may be solids, semi-solids or liquids.

In one or more embodiments, the asphalt binder includes AC-5, AC-10 and AC-15. These asphalts typically contain about 40 to about 52 parts by weight of aromatic hydrocarbons, about 20 to about 44 parts by weight of a polar organic compound, about 10 to about 15 parts by weight of asphaltene, about 6 to about 8 parts by weight of saturates, and about 4 to about 5 parts by weight of sulfur. Nevertheless, practice of the present invention is not limited by selection of any particular asphalt.

In one or more embodiments, the molecular weight of the aromatic hydrocarbons present in asphalt may range between about 300 and 2000, while the polar organic compounds, which generally include hydroxylated, carboxylated and heterocyclic compounds, may have a weight average molecular weight of about 500 to 50,000. Asphaltenes, which are generally known as heavy hydrocarbons, are typically of a high molecular weight and are heptane insoluble. Saturates generally include paraffinic and cycloaliphatic hydrocarbons having about 300 to 2000 molecular weight.

In one or more embodiments, bitumens may be used. Bitumens are naturally occurring solidified hydrocarbons, typically collected as a residue of petroleum distillation. Gilsonite is believed to be the purest naturally formed bitumen, typically having a molecular weight of about 3,000 with about 3 parts by weight complexed nitrogen.

Inorganic Filler

In one or more embodiments, the inorganic filler may include naturally-occurring inorganic materials, synthetic inorganic materials, and mixtures thereof. Useful naturally-occurring inorganic materials include, but are not limited to, crushed stone, gravel, sand, silica, colmenite, or mixtures of one more thereof. Specific examples include, but are not limited to, marble, limestone (i.e. calcium carbonate), basalt, dolomite, sandstone, granite, and mixture of two or more thereof. Useful synthetic fillers include, but are not limited to, glass (e.g. glass beads), quartzite, steel slag, and mixtures of two or more thereof.

Polymeric Modifiers

In one or more embodiments, the polymeric modifier, which may simply be referred to as polymer, includes thermoplastic polymers, thermosetting elastomers, thermoplastic elastomers, and/or mixtures thereof. Each of these polymers have been used, either alone or in combination with each other to modify asphalt binders, and practice of the present invention is not necessarily limited by the selection of any particular polymeric modifier.

In one or more embodiments, the polymers may be characterized by a glass transition temperature (Tg), as measured by DSC analysis, of less than 150° C., in other embodiment less than 125° C., in other embodiment less than 100° C., in other embodiments less than 20° C., in other embodiments less than 0° C., in other embodiments less than −20° C., in other embodiments less than −35° C., and in other embodiments from about −90° C. to about −20° C. In these or other embodiments, the polymers may be characterized by a glass transition temperature (Tg), as measured by DSC analysis, of more than −20° C., in other embodiments more than 0° C., in other embodiments more than 20° C., in other embodiments more than 50° C., and in other embodiments more than 100° C.

In one or more embodiments, the polymeric modifier may be characterized by a melt index (ASTM D-1238; 2.16 kg load @ 190° C.) of less than 1,000 dg/min, in other embodiments less than 500 dg/min, in other embodiments less than 50 dg/min, in other embodiments less than 20 dg/min, in other embodiments less than 10 dg/min, and in other embodiments less than 1 dg/min. In these or other embodiments, the unsaturated polymers may have a melt index of between 3 and 15 dg/min, and other embodiments between 4 and 12 dg/min.

In one or more embodiments, the polymeric modifier may be characterized by a number average molecular weight ($M_n$) of from about 10 to about 1,000 kg/mol, in other embodiments from about 40 to about 500 kg/mol, and in other embodiments from about 80 to about 200 kg/mol. In these or other embodiments, the polymeric modifier may also be characterized by a weight average molecular weight ($M_w$) of from about 10 to about 4,000 kg/mol, in other embodiments from about 40 to about 2,000 kg/mol, and in other embodiments from about 80 to about 800 kg/mol. In one or more embodiments, the polymeric modifier may be characterized by a molecular weight distribution of from about 1.1 to about 5, in other embodiments from about 1.5 to about 4.5, and in other embodiments from about 1.8 to about 4.0. Molecular weight can be determined by gel permeation chromatography (GPC) calibrated with polystyrene standards and adjusted for the Mark-Houwink constants for the polymer in question.

The polymeric modifier may be linear, branched, or coupled polymers. Types of polymers may include both natural and synthetic polymers. Useful synthetic polymers may include polydienes or polydiene copolymers with non-diene comonomer (e.g., styrene). The copolymers may include block and random copolymers. The coupled polymers may include linearly coupled polymers (e.g. di-coupled polymers) or raidally coupled polymers (e.g. tri-coupled or, tetra-coupled penta-coupled, hexa-coupled etc.). Exemplary polydienes include polybutadiene and polyisoprene. Exemplary copolymers may include random styrene-butadiene rubber, styrene-butadiene block copolymer, styrene-butadiene-styrene block copolymer, random styrene-isoprene, styrene-isoprene block copolymer, styrene-isoprene-butadiene block copolymer, random styrene-isoprene-butadiene, styrene-isoprene-styrene block copolymer, and chloroprene rubber. In one or more embodiments, the polymeric modifier include linear or radial block copolymers wherein the block copolymers include terminal styrene blocks. In these or other embodiments, the styrene content of these block copolymers may be from 10% to 50% by weight, in other embodiments from 15% to 45% by weight, and in other embodiments from 20% to 40% by weight.

In one or more embodiments, the polymeric modifier is an SBS block copolymer (i.e. poly(styrene-b-butadiene-b-styrene). In one or more embodiments, these block copolymers may be characterized by a weight average molecular weight of from about 90,000 to about 750,000, or in other embodiments from about 150,000 to about 250,000. In these or other embodiments, these polymers may be characterized by a polydispersity of up to about 1.1 or in other embodiments up to about 1.05. In particular embodiments, the SBS block copolymers have from about 27 to about 43 parts by weight of styrene.

An example of an SBS block copolymer useful for practice of the present invention is that sold under the tradename Kraton D (Kraton Polymer Group), including, for example, D1118, D1101, and D1184. Included among these polymers are SBS block linear and radial block copolymers. In particular embodiments, two block copolymers, linear and radial, can be mixed to achieve the desired results. In certain embodiments, the weight ratio of linear to radial SBS copolymers may be from about 0 to about 7 parts by weight of radial and from about 7 to about 15 parts by weight of linear SBS block copolymer.

In one or more embodiments, useful thermoplastic polymers that may used as the polymeric modifier include polyolefins. For example, several derivatives of polypropylene are useful including those prepared by first dimerizing propylene to give 4-methyl-1-pentene and subsequently polymerizing this dimer to give poly-4-methyl-1-pentene. These polypropylenes may have a weight average molecular weight of from about 50,000 to about 250,000, or in other embodiments from about 150,000 to about 170,000. In one or more embodiments, the polydispersity may be from about 2.5 to about 3.5. The polypropylene may be further characterized by a melt temperature of from about 160° C. to about 175° C., and may have a cold crystallization temperature above 120° C.

In one or more embodiments, the polymeric modifier is isotactic polypropylene (IPP). In one or more embodiments, the IPP has at least 45 percent by weight crystallinity, or in other embodiments from about 46 to about 50 percent by weight crystallinity. Blends of atactic polypropylene and isotactic polypropylene may be used. In yet other embodiments, atactic polyalpha olefins (APAOs) may be used.

Complementary Flame Retardants

As mentioned above, the expandable graphite may be used in conjunction with a complementary flame retardant. Flame retardants may include any compound that increases the burn resistivity, particularly flame spread such as tested by UL 94 and/or UL 790, in the polymeric compositions of the present invention. Generally, useful flame retardants include those that operate by forming a char-layer across the surface of a specimen when exposed to a flame. Other flame retardants include those that operate by releasing water upon thermal decomposition of the flame retardant compound. Useful flame retardants may also be categorized as halogenated flame retardants or non-halogenated flame retardants.

Exemplary non-halogenated flame retardants include magnesium hydroxide, aluminum trihydrate, zinc borate, ammonium polyphosphate, melamine polyphosphate, and antimony oxide ($Sb_2O_3$). Magnesium hydroxide ($Mg(OH)_2$) is commercially available under the tradename Vertex™ 60, ammonium polyphosphate is commercially available under the tradename Exolite™ AP 760 (Clarian), which is sold together as a polyol masterbatch, melamine polyphosphate is available under the tradename Budit™ 3141 (Budenheim), and antimony oxide ($Sb_2O_3$) is commercially available under the tradename Fireshield™.

Examples of other complementary calcium borate, magnesium hydroxide, basic magnesium carbonate, aluminum trihydrate, zinc borate, gypsum, and mixtures thereof. In these or other embodiments, the complementary flame retardant includes colemanite, which is a borate mineral that is believed to include about 50-80% calcium borate.

Tackifier Resin

In one or more embodiments, the asphaltic component may include tackifier resins. These resins include, but are not limited to, petroleum resins, synthetic polyterpenes, resin esters and natural terpenes, and combinations thereof. In certain embodiments, the resin modifiers soften or become liquid at temperatures of about 40° C. to about 150° C. In certain embodiments, the resin modifiers have number average molecular weights, as measured by vapor phase osmometry, below that of the polymeric material included in the polymeric film. In certain embodiments, the number average molecular weights of the resin modifiers are less than about 5,000. In other embodiments, the number average molecular weights of the resin modifiers are less than about 1,000. In additional embodiments, the number average molecular weights of the resin modifiers are from about 500 to about 1000.

In certain embodiments, the resin modifiers have ring and ball softening point of about 20° C. to about 160° C. In additional embodiments, resin modifiers have ring and ball softening points of about 40° C. to about 160° C. In still other embodiments, resin modifiers have ring and ball softening points of about 50° C. to about 160° C.

Various types of natural and synthetic resins, alone or in admixture with each other, may be used be selected as the resin modifier. Suitable resins include, but are not limited to, natural rosins and rosin esters, hydrogenated rosins and hydrogenated rosin esters, coumarone-indene resins, petroleum resins, polyterpene resins, and terpene-phenolic resins. Specific examples of suitable petroleum resins include, but are not limited to, aliphatic hydrocarbon resins, hydrogenated aliphatic hydrocarbon resins, mixed aliphatic and aromatic hydrocarbon resins, hydrogenated mixed aliphatic and aromatic hydrocarbon resins, cycloaliphatic hydrocarbon resins, hydrogenated cycloaliphatic resins, mixed cycloaliphatic and aromatic hydrocarbon resins, hydrogenated mixed cycloaliphatic and aromatic hydrocarbon resins, aromatic hydrocarbon resins, substituted aromatic hydrocarbons, and hydrogenated aromatic hydrocarbon resins. As used herein, "hydrogenated" includes fully, substantially and at least partially hydrogenated resins. Suitable aromatic resins include aromatic modified aliphatic resins, aromatic modified cycloaliphatic resin, and hydrogenated aromatic hydrocarbon resins. Any of the above resins may be grafted with an unsaturated ester or anhydride to provide enhanced properties to the resin. For additional description of resin modifiers, reference can be made to technical literature, e.g., Hydrocarbon Resins, Kirk-Othmer, Encyclopedia of Chemical Technology, 4th Ed. v. 13, pp. 717-743 (J. Wiley & Sons, 1995).

In one or more embodiments, the tackifier resins include phenol-based resins. Included among the phenol-based resins are phenolic resins. These resins may include reactive phenol resins (also referred to as functionalized phenol resins), as well as unreactive resins. In one or more embodiments, the phenolic resin is a resole resin, which can be made by the condensation of alkyl, substituted phenols, or unsubstituted phenols with aldehydes such as formaldehyde in an alkaline medium or by condensation of bi-functional phenoldialcohols. In one or more embodiments, this condensation reaction occurs in the excess or molar equivalent of formaldehyde. In other embodiments, the phenolic resin may be formed by an acid-catalyzed reaction.

In one or more embodiments, the tackifier resin is a polybutene polymer or oligomer. In particular embodiments, polybutene oils are employed. Useful polybutene oils include high-viscosity oils that may be characterized by a viscosity at 100° C. of at least 80 cst, in other embodiments at least 100 cst, or in other embodiments at least 120 cst up to, for example, about 700 or 800 cst. In these or other embodiments, the high viscosity polybutene oils may be characterized by a molecular weight of at least 1000 g/mole, in other embodiments at least 1200 g/mole, or in other embodiments at least 1300 g/mole up to, for example, 1400 or 1500 g/mole. An exemplary high-viscosity polybutene oil is available under the tradename Indapol H300 (Ineos) or PB32 (Soltex).

Masterbatch Amounts

In one or more embodiments, the asphaltic masterbatch includes at least 30, in other embodiments at least 45, in other embodiments at least 60, and in other embodiments at least 70 percent by weight asphalt binder based upon the total weight of the masterbatch. In these or other embodiments, the asphaltic masterbatch includes at most 95, in other embodiments at most 90, and in other embodiments at most 85 percent by weight asphalt binder based upon the total weight of the masterbatch. In one or more embodiments, the asphaltic masterbatch includes from about 30 to about 95, in other embodiments from about 45 to about 90, and in other embodiments from about 60 to about 85 percent by weight asphalt binder based upon the total weight of the masterbatch.

In one or more embodiments, the asphaltic masterbatch includes at least 0, in other embodiments at least 5, in other embodiments at least 10, and in other embodiments at least 20 parts by weight inorganic filler per 100 parts by weight asphalt binder. In these or other embodiments, the asphaltic masterbatch includes at most 350, in other embodiments at most 100, in other embodiments at least 70, in other embodiments at least 50, and in other embodiments at most 40 parts by weight inorganic filler per 100 parts by weight asphalt binder. In still other embodiments, the asphaltic masterbatch includes from 0 to 350, in other embodiments from 1 to 100, and in other embodiments from 5 to 45 parts by weight inorganic filler per 100 parts by weight asphalt binder.

In one or more embodiments, the asphaltic masterbatch includes at least 0.5, in other embodiments at least 1, in other embodiments at least 3, and in other embodiments at least 5 parts by weight polymeric modifier per 100 parts by weight asphalt binder. In these or other embodiments, the asphaltic masterbatch includes at most 40, in other embodiments at most 30, and in other embodiments at most 20 parts by weight polymeric modifier per 100 parts by weight asphalt binder. In one or more embodiments, the asphaltic masterbatch includes from about 0.5 to about 40, in other embodiments from about 1 to about 30, and in other embodiments from about 3 to about 20 parts by weight polymeric modifier per 100 parts by weight asphalt binder.

In one or more embodiments, the asphaltic masterbatch may include 0, in other embodiments at least 0.5, in other embodiments at least 1, in other embodiments at least 3, and in other embodiments at least 5 parts by weight complementary flame retardant per 100 parts by weight asphalt binder. In these or other embodiments, the asphaltic masterbatch includes at most 40, in other embodiments at most 30, and in other embodiments at most 20 parts by weight complementary flame retardant per 100 parts by weight asphalt binder. In one or more embodiments, the asphaltic masterbatch includes from about 0.5 to about 40, in other embodiments from about 1 to about 30, and in other embodiments from about 3 to about 20 parts by weight complementary flame retardant per 100 parts by weight asphalt binder.

In one or more embodiments, the asphaltic masterbatch may include 0, in other embodiments at least 0.5, in other embodiments at least 1, in other embodiments at least 3, and in other embodiments at least 5 parts by weight tackifier resin per 100 parts by weight asphalt binder. In these or other embodiments, the asphaltic masterbatch includes at most 40, in other embodiments at most 30, and in other embodiments at most 20 parts by weight tackifier resin per 100 parts by weight asphalt binder. In one or more embodiments, the asphaltic masterbatch includes from about 0.5 to about 40, in other embodiments from about 1 to about 30, and in other embodiments from about 3 to about 20 parts by weight tackifier resin per 100 parts by weight asphalt binder.

Expandable Graphite

Expandable graphite may also be referred to as expandable flake graphite, intumescent flake graphite, or expandable flake; and, for the purposes herein, these terms may be used interchangeably. In one or more embodiments, expandable graphite includes intercalated graphite in which an intercallant material is included between the graphite layers of graphite crystal or particle. Examples of intercallant materials include halogens, alkali metals, sulfates, nitrates, various organic acids, aluminum chlorides, ferric chlorides, other metal halides, arsenic sulfides, and thallium sulfides. In certain embodiments of the present invention, the expandable graphite includes non-halogenated intercallant materials. In certain embodiments, the expandable graphite includes sulfate intercallants, also referred to as graphite bisulfate. As is known in the art, bisulfate intercalation is achieved by treating highly crystalline natural flake graphite with a mixture of sulfuric acid and other oxidizing agents which act to catalyze the sulfate intercalation.

Commercially available examples of expandable graphite include HPMS Expandable Graphite (HP Materials Solutions, Inc., Woodland Hills, Calif.) and Expandable Graphite Grades 1721 (Asbury Carbons, Asbury, N.J.). Other commercial grades contemplated as useful in the present invention include 1722, 3393, 3577, 3626, and 1722HT (Asbury Carbons, Asbury, N.J.).

In one or more embodiments, the expandable graphite may be characterized as having a mean or average size in the range from about 30 μm to about 1.5 mm, in other embodiments from about 50 μm to about 1.0 mm, and in other embodiments from about 180 to about 850 μm. In certain embodiments, the expandable graphite may be characterized as having a mean or average size of at least 30 μm, in other embodiments at least 44 μm, in other embodiments at least 180 μm, and in other embodiments at least 300 μm. In one or more embodiments, expandable graphite may be characterized as having a mean or average size of at most 1.5 mm, in other embodiments at most 1.0 mm, in other embodiments at most 850 μm, in other embodiments at most 600 μm, in yet other embodiments at most 500 μm, and in still other embodiments at most 400 μm. Useful expandable graphite includes Graphite Grade #1721 (Asbury Carbons), which has a nominal size of greater than 300 μm.

In one or more embodiments, the expandable graphite may be characterized as having a median size in the range from about 30 μm to about 1.5 mm, in other embodiments from about 50 μm to about 1.0 mm, and in other embodiments from about 180 to about 850 μm. In certain embodiments, the expandable graphite may be characterized as having a median size of at least 30 μm, in other embodiments at least 44 μm, in other embodiments at least 180 μm, and in other embodiments at least 300 μm. In one or more embodiments, expandable graphite may be characterized as having a median size of at most 1.5 mm, in other embodiments at most 1.0 mm, in other embodiments at most 850 μm, in other embodiments at most 600 μm, in yet other embodiments at most 500 μm, and in still other embodiments at most 400 μm.

In one or more embodiments of the present invention, the expandable graphite may be characterized as having a nominal particle size of 20×50 (US sieve). US sieve 20 has an opening equivalent to 0.841 mm and US sieve 50 has an opening equivalent to 0.297 mm. Therefore, a nominal particle size of 20×50 indicates the graphite particles are at least 0.297 mm and at most 0.841 mm.

In one or more embodiments, the expandable graphite may be characterized as having a carbon content in the range from about 80% to about 99%. In certain embodiments, the expandable graphite may be characterized as having a carbon content of at least 80%, in other embodiments at least 85%, in other embodiments at least 90%, in yet other embodiments at least 95%, in other embodiments at least 98%, and in still other embodiments at least 99% carbon.

In one or more embodiments, the expandable graphite may be characterized as having a sulfur content in the range from about 0% to about 8%, in other embodiments from about 2.6% to about 5.0%, and in other embodiments from about 3.0% to about 3.5%. In certain embodiments, the expandable graphite may be characterized as having a sulfur content of at least 0%, in other embodiments at least 2.6%, in other embodiments at least 2.9%, in other embodiments at least 3.2%, and in other embodiments 3.5%. In certain embodiments, the expandable graphite may be characterized as having a sulfur content of at most 8%, in other embodiments at most 5%, in other embodiments at most 3.5%.

In one or more embodiments, the expandable graphite may be characterized as having an expansion ratio (cc/g) in the range from about 10:1 to about 500:1, in other embodiments at least 20:1 to about 450:1, in other embodiments at least 30:1 to about 400:1, in other embodiments from about 50:1 to about 350:1. In certain embodiments, the expandable graphite may be characterized as having an expansion ratio (cc/g) of at least 10:1, in other embodiments at least 20:1, in other embodiments at least 30:1, in other embodiments at least 40:1, in other embodiments at least 50:1, in other embodiments at least 60:1, in other embodiments at least 90:1, in other embodiments at least 160:1, in other embodiments at least 210:1, in other embodiments at least 220:1, in other embodiments at least 230:1, in other embodiments at least 270:1, in other embodiments at least 290:1, and in yet other embodiments at least 300:1. In certain embodiments, the expandable graphite may be characterized as having an expansion ratio (cc/g) of at most 350:1, and in yet other embodiments at most 300:1.

In one or more embodiments, the expandable graphite, as it exists with the asphaltic component of the asphaltic sheet of the present invention, is partially expanded. In one or more embodiments, the expandable graphite is not expanded, however, to a deleterious degree, which includes that amount or more of expansion that will deleteriously the ability to form the sheet product and the ability of the graphite to serve as flame retardant at desirable levels, which include those levels that allow proper formation of the sheet. In one or more embodiments, the expandable graphite is expanded to at most 60%, in other embodiments at most 50%, in other embodiments at most 40%, in other embodiments at most 30%, in other embodiments at most 20%, and in other embodiments at most 10% beyond its original unexpanded size.

In one or more embodiments, the expandable graphite may be characterized as having a pH in the range from about 1 to about 10; in other embodiments from about 1 to about 6; and in yet other embodiments from about 5 to about 10. In certain embodiments, the expandable graphite may be characterized as having a pH in the range from about 4 to about 7. In one or more embodiments, the expandable graphite may be characterized as having a pH of at least 1, in other embodiments at least 4, and in other embodiments at least 5. In certain embodiments, the expandable graphite may be characterized as having a pH of at most 10, in other embodiments at most 7, and in other embodiments at most 6.

In one or more embodiments, the expandable graphite may be characterized by an onset temperature ranging from about 100° C. to about 250° C.; in other embodiments from about 160° C. to about 225° C.; and in other embodiments from about 180° C. to about 200° C. In one or more embodiments, the expandable graphite may be characterized by an onset temperature of at least 100° C., in other embodiments at least 130° C., in other embodiments at least 160° C., and in other embodiments at least 180° C. In one or more embodiments, the expandable graphite may be characterized by an onset temperature of at most 250° C., in other embodiments at most 225° C., and in other embodiments at most 200° C. Onset temperature may also be interchangeably referred to as expansion temperature and also alternatively referred to as the temperature at which expansion of the graphite starts.

Expandable Graphite Amounts

In one or more embodiments, regardless of the embodiment practiced, the amount of expandable graphite added or introduced to the masterbatch may be described with reference to the amount of asphalt binder present in the masterbatch. For example, in one or more embodiments, the amount of expandable graphite added is at least 0.5, in other embodiments at least 1, in other embodiments at least 3 and in other embodiments at least 5 parts by weight expandable graphite per 100 parts by weight asphalt binder. In these or other embodiments, the amount of expandable graphite added is at most 40, in other embodiments at most 30, and in other embodiments at most 20 parts by weight expandable graphite per 100 parts by weight asphalt binder. In one or more embodiments, the amount of expandable graphite added is from about 0.5 to about 40, in other embodiments from about 1 to about 30, and in other embodiments from about 3 to about 20 parts by weight expandable graphite per 100 parts by weight asphalt binder.

Method of Making Masterbatch and Final Composition

First Embodiment

As set forth above, a first embodiment of the present invention includes the preparation of a first asphaltic composition (a.k.a. asphaltic masterbatch) at a first temperature, followed by a cooling of the masterbatch to a second temperature that is lower than the first temperature, and the expandable graphite is introduced to the masterbatch as the second temperature. This procedure advantageously allows for the use of sufficient heat and energy to blend the components of the masterbatch in the absence of the expandable graphite. Then, upon cooling to a temperature that will not cause deleterious expansion of the expandable graphite, the expandable graphite can be added to form the final molten asphaltic composition that can then be fabricated into an asphaltic sheet.

Practice of one or more embodiments of the invention does not necessarily impact formation of the masterbatch and thus conventional techniques for preparing blends of molten asphalt, filler, and any of the other optional ingredients may be employed. In this respect, U.S. Pat. No. 5,516,817 is incorporated herein by reference.

In one or more embodiments, the asphalt binder is heated under mixing and/or shear to a temperature of at least 150° C., in other embodiments at least 175° C., in other embodiments at least 195° C., in other embodiments at least 205° C., and in other embodiments at least 215° C. During the heating process or after a desired temperature has been obtained, the polymeric modifier is introduced to the molten asphalt and mixing and/or shear is continued. Also, during or after attainment of a desired temperature, which may be referred to as the first temperature, the other optional ingredients, such as the inorganic filler and/or tackifier resins, may be added. Mixing and heating of the composition at desired elevated temperatures (i.e. the first temperature) is continued until a desired blend is achieved. For example, mixing may continue until a homogeneous blend of the ingredients is achieved. In one or more embodiments, masterbatch, prior to cooling, is devoid of expandable graphite. In these or other embodiments, the masterbatch is, prior to cooling, substantially devoid of expandable graphite, which refers to that amount or less of expandable graphite that would otherwise have an appreciable impact on the composition or the practice of the invention.

In one or more embodiments, the masterbatch is mixed at an elevated temperature (e.g. above 150 or 175° C.) for at least 5, in other embodiments at least 10, and in other embodiments at least 20 minutes. In one or more embodiments, mixing under the desired first temperature is continued for about 5 to about 120, or in other embodiments for about 10 to about 50 minutes.

After the desired heating and mixing that is performed in the first step, the masterbatch is cooled, which cooled temperature may be referred to as the second temperature. Cooling of the masterbatch may be achieved by one or more methods. For example, the masterbatch can be cooled by simply removing external heat sources and allowing the composition to cool over time. In other embodiments, an external cooling source may be applied to the composition, such as in the form of a cooling water jacket. In yet other embodiments, a material that can absorb heat from the system (i.e. a heat sink) may be added to the composition. In one or more embodiments, the heat sink may include additional ingredients of the type that are already present in the masterbatch, or it may include ingredients of the type not already present in the masterbatch. For example, in the former situation, additional asphalt may be added as a heat sink. Or, an example of the latter may include tackifier or other oil that may not have been present during formation of the masterbatch.

In certain embodiments, the masterbatch is cooled to a temperature of less than 215° C., in other embodiments is less than 205° C., in other embodiments less than 195° C., in other embodiments less than 185° C., in other embodiments less than 175° C., in other embodiments less than 165° C., in other embodiments less than 155° C., and in other embodiments less than 145° C. In these or other embodiments, the temperature of the masterbatch is maintained at temperature of least 125° C., in other embodiments at least 140° C., in other embodiments at least 150° C., in other embodiments at least 160° C., and in other embodiments at least 170° C. In one or more embodiments, the masterbatch is cooled to a temperature of from about 125° C. to about 215° C., in other embodiments from about 140° C. to about 205° C., and in other embodiments from about 150° C. to about 195° C.

Once the desired second temperature is achieved by cooling the masterbatch, expandable graphite is introduced to the cooled composition. Mixing or shear may be applied to the composition during the addition of the expandable graphite.

Following the cooling step, the expandable graphite is introduced to the molten asphalt composition and mixed at temperatures of less than 200° C., in other embodiments less than 190° C., in other embodiments less than 185° C., in other embodiments less than 175° C., in other embodiments less than 165° C., in other embodiments less than 155° C., and in other embodiments less than 145° C.

After introduction of the expandable graphite to the masterbatch, the desired temperature may be maintained while mixing continues. In other words, these temperatures are maintained during mixing and processing in the presence of the expandable graphite. In one or more embodiments, mixing under the desired second temperature continues for at least 1, in other embodiments for at least 2, and in other embodiments for at least 3 minutes. In one or more embodiments, mixing under the desired second temperature continues for at most 10, in other embodiments for at most 7, and in other embodiments for at most 5 minutes. In one or more embodiments, mixing under the desired second temperature is continued for about 1 to about 25, or in other embodiments for about 2 to about 7 minutes. The resultant composition, which includes the expandable graphite, may be referred to as the final molten asphaltic composition.

Second Embodiment

As described above, in an alternate embodiment, which may be practiced in conjunction with the first embodiment, the expandable graphite is combined with a carrier material to form a concentrate. This concentrate can then be added to the masterbatch to form the final molten asphaltic composition, which includes expandable graphite. It is believed that the presence of the carrier will advantageously allow for more efficient introduction of the expandable graphite into the masterbatch, which will allow for introduction and mixing at lower temperatures and energies, which in turn will result in less expansion of the expandable graphite.

Carrier Material

In one or more embodiments, the carrier material that may be employed to form the expandable graphite is a material that is readily dispersible in molten asphalt. These materials may generally include low-viscosity hydrocarbon materials. In one or more embodiments, these materials may include hydrocarbon oils, waxes, tackifier resins, and low-molecular weight thermoplastic polymers. In other embodiments, these materials may include asphaltic materials including the asphaltic material used to prepare the masterbatch as well as low-viscosity asphaltic materials.

In those embodiments where a hydrocarbon oil employed as a carrier, the oil may be characterized by a viscosity (CST @ 40° C.) of less than 600, in other embodiments less than 550, in other embodiments less than 475, and in other embodiments less than 400. In these or other embodiments, the hydrocarbon oil may have a viscosity of from about 130 to about 600, in other embodiments from about 180 to about 500, or in other embodiments from about 250 to about 400. Examples of useful oils include those described herein including, but not limited to, naphthenic, paraffinic, and aromatic oils.

In those embodiments where a wax is employed as a carrier, the wax may be characterized by a Brookfield viscosity (cP @ 190° C.) of from about 300 to about 20,000, in other embodiments from about 500 to about 10,000, and in other embodiments from about 1000 to about 5000. Examples of useful wax include, but are not limited to, amorphous polyolefin waxes.

In those embodiments where a tackifier resin is employed as a carrier, the tackifier resin may be characterized by Brookfield viscosity (cP @ 190° C.) from about 100 to about 1000 or in other embodiments from about 200 to about 400. In these or other embodiments, the resin may be characterized by a viscosity (ASTM D445 @ 100° C.) of from about 10 to about 45,000, in other embodiments from about 100 to about 30,000, and in other embodiments from about 1000 to about 10,000. In these or other embodiments, the resins may characterized by a density of from about 0.8 to a bout 0.92 g/cm3. Useful tackifier resins include, but are not limited to, those described herein such as hydrocarbon resins and polybutene oils.

In those embodiments where a low-molecular weight thermoplastic polymer is employed as the carrier, the polymer may be characterized by a melt index (@ 190° C.) of at least 2, in other embodiments at least 10, and in other embodiments at least 100. In these or other embodiments, the polymer may have a melt index of from about 2 to about 500, in other embodiments from about 5 to about 400, or in other embodiments from about 3 to about 300. In one or more embodiments, these polymers may be characterized by a viscosity of from about 2000 to about 10,000, or in other embodiments from about 3000 to about 8000 mPa·s) Useful polymers include, but are not limited to, ethylenevinyl acetate polymers, ethylene methyl acrylate polymers, and the like.

In those embodiments where a low-viscosity asphalt is employed as a carrier, the asphalt may have a viscosity (60° C.), Pa·s) of from about 20 to about 50 or in other embodiments from about 25 to about 40. Examples of useful asphalts include AC-2.5 through AC-40 grade asphalts.

Examples of useful carrier materials include, but are not limited to, asphalt (both conventional and lower viscosity asphalt with or without other components such as polymer, filler, oil, tackifier, etc), oil, wax, tackifier resin, low melting point and/or low molecular weight polymers, elastomers, block copolymers, and the like, as well as mixtures of two or more thereof.

As indicated above, the combination of the expandable graphite and the carrier material form a concentrate. In one or more embodiments, the concentrate includes sufficient carrier material to coat the particles of expandable graphite. In one or more embodiments, the concentrate forms a matrix in which the expandable graphite is dispersed. In one or more embodiments, the carrier is the major volume fraction of the concentrate. In other embodiments, the carrier is the major weight fraction of the concentrate. In one or more embodiments, weight ratio of carrier material to expandable graphite is at least 0.5:1, in other embodiments at least 1:1, and in other embodiments at least 2:1. In these or other embodiments, the weight ratio of carrier material to expandable graphite is from about 0.5:1 to about 6:1, in other embodiments from about 1:1 to about 5:1, and in other embodiments from about 2:1 to about 4:1.

In one or more embodiments, and in a similar fashion to the embodiments described above, the masterbatch may be cooled prior to introducing the concentrate. Once the desired second temperature is achieved by cooling the masterbatch, the concentrate including the expandable graphite is introduced to the cooled composition. Mixing or shear may be applied to the composition during the addition of the concentrate. In one or more embodiments, the concentrate is introduced to the masterbatch and mixed at temperatures of less than 200° C., in other embodiments less than 190° C., in other embodiments less than 185° C., in other embodiments less than 175° C., in other embodiments less than 165° C., in other embodiments less than 155° C., and in other embodiments less than 145° C.

After introduction of the expandable graphite to the masterbatch, the desired temperature may be maintained while mixing continues and the final molten asphaltic composition is ultimately produced.

Method of Making Sheet

Practice of one or more embodiments of the invention is not necessarily limited by the method by which the asphaltic sheet is fabricated using the final molten asphaltic composition. In this respect, the asphaltic sheet of the present invention may generally be prepared by using conventional techniques for forming asphaltic sheet. For example, the technique may include, in certain embodiments, saturating a reinforcing textile with the final molten asphaltic composition. The step of saturating the sheet may include submerging the reinforcing sheet into a bath of the final molten asphaltic composition. In other embodiments, the step of saturating the sheet may include spraying, roll coating, or otherwise applying the final molten asphaltic composition to a reinforcing sheet. Where a reinforcing sheet is not employed, the final molten asphaltic material can be applied to release paper or film and then processed into a sheet that is devoid of reinforcing scrim.

In an exemplary process, a reinforcing sheet, which may be in the form of a planar sheet and may be provided in the form of a roll, is provided. In one or more embodiments, reinforcing sheet may be a scrim, or fiberglass mesh sheet, as is known in the art. Useful scrims include those that are commercially available. For example, fiberglass scrims are available under the trade name STYLE™ 930120 (Milliken & Co.; Spartanburg, S.C.) and also available from J. P. Stevens (Greenville, S.C.). In other embodiments, reinforcing sheet may be an organic felt or a combination polyester and glass mat. Useful polyester mats are available from Freudenberg & Co. of Germany. In one or more embodiments, the asphalt coater may be a reservoir of hot liquid asphalt. In other embodiments, the asphalt coater may include spraying apparatus to coat the reinforcing sheet with liquid asphalt. In yet other embodiments, reinforcing sheet may be coated with the final molten asphaltic composition by any alternative methods known to persons having ordinary skill in the art. In one or more embodiments, the reinforcing sheet is drawn through an asphalt coater, which applies hot liquid (i.e. molten asphalt) to the reinforcing sheet to create a sheet that is saturated with the final molten asphaltic composition.

In certain embodiments, a polymeric layer is applied to the asphaltic sheet after application of the expandable graphite particles. For example, following one or more drops or applications of the expandable graphite particles to a surface of the asphaltic sheet, a polymeric film may be applied over the expandable graphite particles. In one or more embodiments, this may facilitate subsequent calendaring of the asphaltic sheet carrying the expandable graphite particles. In other embodiments, the layer of expandable graphite particles may be modified by the application of a release agent, such as sand, silica, or talc, over the expandable graphite particles. The presence of release agents may, like the polymeric film, facilitate subsequent calendaring of the asphaltic sheet.

In one or more embodiments, the asphaltic sheet may be drawn through a cooling station to cool the hot asphalt and create a more stable substrate for the application of granules. In one or more embodiments, the cooling station may include a water reservoir through which the asphaltic sheet is drawn. In certain embodiments, the asphaltic sheet may float across a water reservoir to cool the sheet while allowing the top surface to retain a higher temperature than the bottom surface. In other embodiments, the cooling station may include other cooling mechanisms known to those skilled in the art.

INDUSTRIAL APPLICABILITY

The asphaltic sheet produced according to methods of the present invention may be used as an underlayment. For example, the sheet may be employed as an underlayment within a metal roofing system. In one or more embodiments, the metal roofing system may include a roof deck, an optional insulation layer, the underlayment of the present invention, and metal panels, which may also be referred to as metal cladding. In other embodiments, the asphaltic sheet of the present invention may be employed as an underlayment within a tile roofing system. In one or more embodiments, the tile roofing system may include a roof deck, an optional insulation layer, the underlayment of the present invention, and roofing tiles.

In one or more embodiments, the underlayment may be applied directly to the roof deck and the insulation boards can be applied over the underlayment. In other embodiments, the underlayment may be applied over the optional insulation layer. Where an insulation layer is not present, the underlayment may be applied directly to the deck.

In other embodiments, the asphaltic sheet produced by the methods of the present invention may be used as a barrier sheet, which may also be referred to as a material. These barrier materials may include air barriers, which are employed to prevent or reduce the flow of oxygen and nitrogen into and/or out of a building structure. In other embodiments, these barrier materials may include vapor barriers, which are employed to prevent or reduce the flow of water vapor into and/or out of a building structure. In yet other embodiments, these barrier materials include moisture barriers, which are employed to prevent or reduce the flow of moisture (i.e. liquid water) into and/or out of a building structure.

In still other embodiments, the asphaltic sheet produced by the methods of the invention may be used as a roofing membrane. For example, the asphaltic sheet may be used as a base sheet or cap sheet in an asphaltic roofing membrane system. In one or more embodiments, these asphaltic membranes are modified asphaltic membranes of the type known in the art. Examples of these membranes, albeit without the expandable graphite, are shown in U.S. Pat. Nos. 6,492,439, 6,486,236, 4,835,199, 7,442,270, 7,146,771, 7,070,843, 4,992,315, and 6,924,015, which are incorporated herein by reference.

In order to demonstrate the practice of the present invention, the following examples have been prepared and tested. The examples should not, however, be viewed as limiting the scope of the invention. The claims will serve to define the invention.

Various modifications and alterations that do not depart from the scope and spirit of this invention will become apparent to those skilled in the art. This invention is not to be duly limited to the illustrative embodiments set forth herein.

What is claimed is:

1. A method for producing an asphaltic sheet, the method comprising:
   (i) preparing an asphaltic masterbatch including an asphalt binder at a first temperature;
   (ii) cooling the asphaltic masterbatch to a second temperature, where the second temperature is lower than the first temperature;
   (iii) adding, after said step of cooling, a concentrate including expandable graphite to form an asphaltic composition including an expandable graphite concentrate; and
   (iv) fabricating an asphaltic sheet from the asphaltic composition including an expandable graphite concentrate by submerging a reinforcing textile into the asphaltic composition including an expandable graphite concentrate.

2. The method of claim 1, where said step of preparing an asphaltic masterbatch includes combining a polymeric modifier and an inorganic filler with the asphalt binder.

3. The method of claim 2, where the asphaltic masterbatch includes at least 0.5 parts by weight inorganic filler per 100 parts by weight asphalt binder.

4. The method of claim 2, where the asphaltic masterbatch includes at least 1 parts by weight inorganic filler per 100 parts by weight asphalt binder.

5. The method of claim 1, where said step of preparing an asphaltic masterbatch includes combining a tackifier with the asphalt binder.

6. The method of claim 1, where said step of preparing an asphaltic masterbatch includes combining an inorganic filler with the asphalt binder.

7. The method of claim 1, where said first temperature is from about 150 to about 260° C.

8. The method of claim 1, where said second temperature is from about 120 to about 200° C.

9. The method of claim 1, where the concentrate includes expandable graphite and a carrier, and where the weight ratio of the carrier to the expandable graphite is from about 0.5:1 to about 6:1.

10. A method for incorporating expandable graphite into a molten asphaltic composition in order to produce a molten asphaltic composition having expandable graphite dispersed therein, the method comprising:
   (i) heating asphaltic binder to a temperature of at least 180° C.;
   (ii) adding one or more constituents to the asphaltic binder and to form a masterbatch;
   (iii) mixing the masterbatch at a temperature of at least 180° C.;
   (iv) cooling the masterbatch to a temperature of at most 170° C.; and
   (v) adding a concentrate including expandable graphite to the masterbatch at a temperature of at most 170° C.; and
   (vi) mixing the concentrate including expandable graphite and the masterbatch to form the asphaltic composition having expandable graphite dispersed therein.

11. The method of claim 10, where said one or more constituents that are added to said asphaltic binder are selected from the group consisting of inorganic filler, polymer modifier, and tackifier resin.

12. The method of claim 10, where said step of heating asphaltic binder includes heating to a temperature of at least 190° C.

13. The method of claim 10, where said step of adding a concentrate including expandable graphite to the masterbatch takes place at a temperature of at most 170° C.

14. The method of claim 10, where the concentrate includes expandable graphite and a carrier, and where the weight ratio of the carrier to the expandable graphite is from about 0.5:1 to about 1:1.

* * * * *